Nov. 18, 1958     R. C. FERGASON     2,860,472
SUSPENSION SYSTEM FOR TRACTOR MOUNTED MOWERS
Filed March 11, 1957     4 Sheets-Sheet 1

Inventor
Rector L. Fergason
By Donald C. McLaughey
Attorney

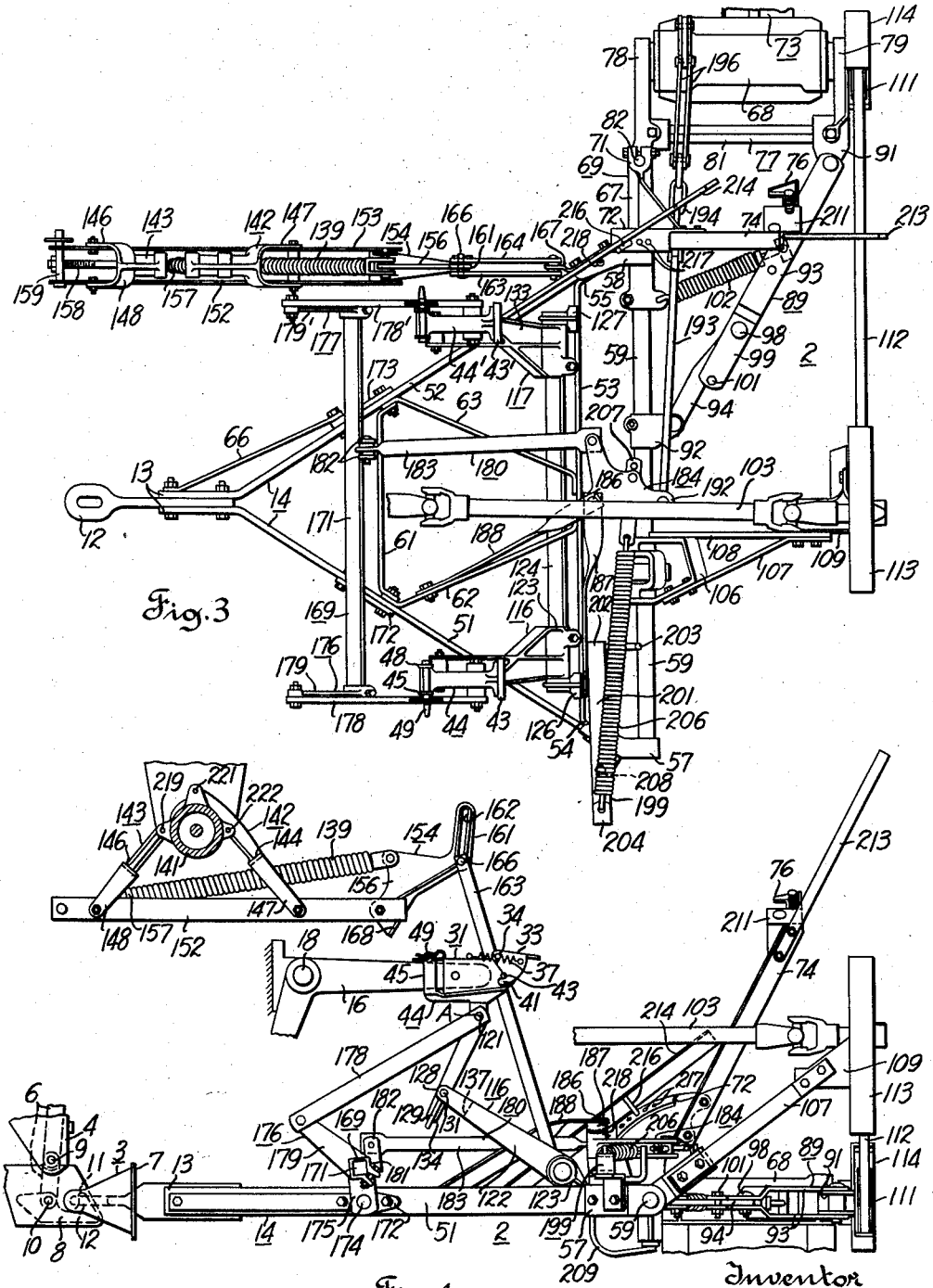

Nov. 18, 1958 R. C. FERGASON 2,860,472
SUSPENSION SYSTEM FOR TRACTOR MOUNTED MOWERS
Filed March 11, 1957 4 Sheets-Sheet 4
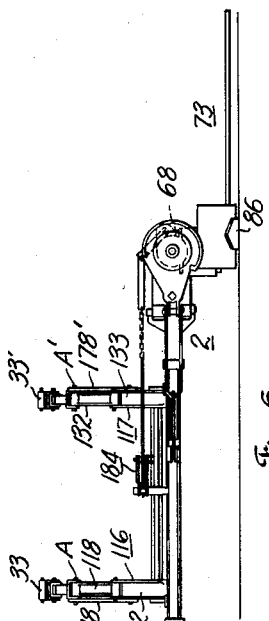
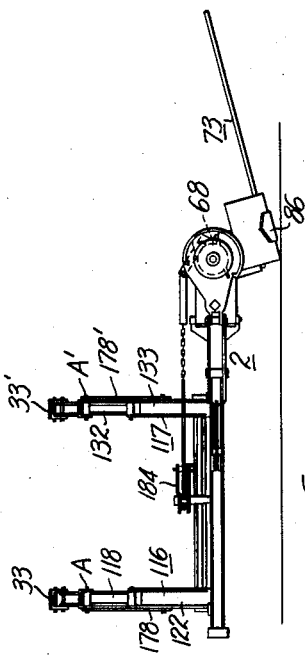
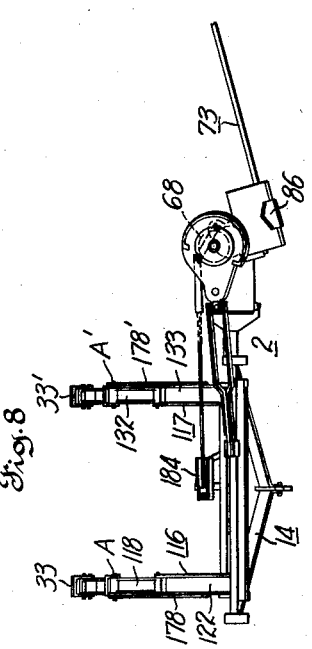
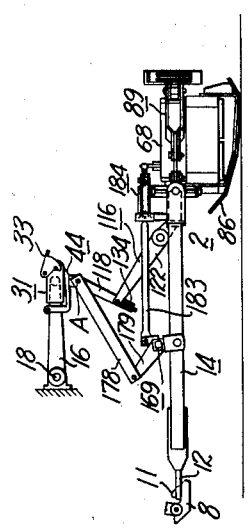
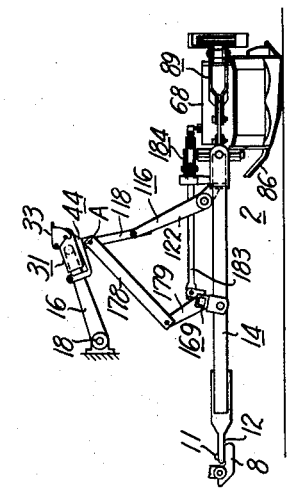
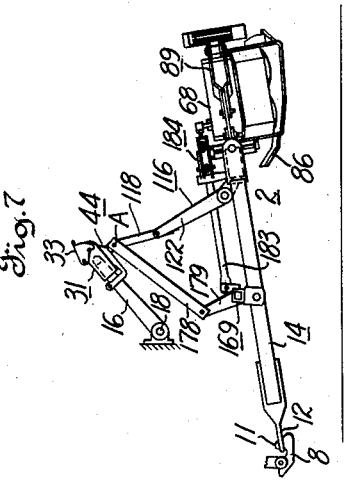
Inventor
Rector C. Fergason
by Donald C. McLaughry
Attorney

United States Patent Office 2,860,472
Patented Nov. 18, 1958

2,860,472

SUSPENSION SYSTEM FOR TRACTOR MOUNTED MOWERS

Rector C. Fergason, Gadsden, Ala., assignor to Allis-Chalmers Manufacturing Company, Milwaukee, Wis.

Application March 11, 1957, Serial No. 645,362

15 Claims. (Cl. 56—25)

This invention relates generally to implement attachments for tractors and more particularly to a mowing attachment of the rear mounted type that is readily attachable to and detachable from the tractor.

In rear mounted tractor mowing attachments of the type which are completely carried by the tractor as heretofore known it has been the practice to rigidly mount the main frame of the mower on the rear of the tractor. A cutter bar supporting subframe is pivotally mounted on the rigid main frame and the cutting mechanism is in turn pivotally mounted on the subframe.

While mowing attachments of the rigid mounted type perform satisfactorily they present particular difficulty in attaching. Frequently more than one person is needed and alignment of attachment brackets is often difficult and time consuming. Rigidly mounted frames of this type have not proven adaptable for use with quick hitching systems which have been introduced for simple and easy mounting of implements on the tractor.

In one type of quick hitch system, for example, the implement frame has a single point draft transmitting connection with the tractor and lifting connections with the hydraulically controlled power lift arms of the tractor. With this type of system it is possible for the operator to attach various types of rear mounted implements on the tractor without leaving his seat on the tractor, and for mounting of others it is only necessary for the operator, upon dismounting, to insert a hitch pin, and tension a counterbalance spring. As the weight of mowing attachments of the rear mounted type is usually heavy, say in excess of six hundred pounds, the desirability of having a mowing implement which can be simply mounted without the necessity of heavy lifting and accurate alignment of mower and tractor is readily apparent.

While a single point draft connection between the main frame of an implement and the tractor is desirable from the standpoint of simplified quick hitching, such a connection presents particular problems when it is utilized for the mounting of a mowing implement on the rear of the tractor. One particular problem is that of providing a mower which may be used with the single point hitch which will be laterally stable. In operation the cutter bar of the mower extends laterally from the mower frame Cutter bars of six and seven feet are in standard use, and the drag of a cutter bar of this length results in side draft which constantly tends to pivot the cutter bar and associated mower frame on a rearward arc having its center at the single point draft connection. If the cutter bar is to be maintained at right angles to the path of tractor travel the supporting frame must be laterally stable so that this side draft is effectively transferred by the mower frame to the tractor.

In addition to mounting the mower frame on the tractor to resist the side draft it is desirable that the operator be able to raise and lower the outer end of the cutter bar independently of raising and lowering the mower frame on which the cutter bar is mounted. By having independent control over the outer end of the cutter bar the operator is able to raise the outer end to avoid obstructions such as stumps, boulders and the like without moving the entire frame to an elevated position. The mechanism affording this type of control must not interfere with or lessen the lateral stability of the mower, and equally important, the mechanism must be such that it presents no difficulty to simplified attachment of the mower to the tractor.

Another desired characteristic is that the mower frame be free at all times to float vertically up and down so that the cutter bar mounted thereon may follow the contour of rough ground as it mows over ditches, dead furrows and the like. The suspension of the mower to resist the effects of cutter bar drag and to provide the desired independent raising and lowering controls should also provide proper vertical flexibility so as not to interfere with this floating action. As mentioned hereinbefore, mowing attachments of this type are quite heavy and for proper floating or ground following action it is necessary that the suspension of the frame on the tractor include counterbalancing provisions which will carry most of the weight of the frame and thereby reduce the weight carried by the inner shoe of the cutter bar. The counterbalancing should be effective throughout the entire range of vertical movement of the frame and not interfere with the ease of attaching and detaching the mower.

Generally it is an object of this invention to provide an improved mower attachment which meets the above outlined requirements in a fully satisfactory manner.

More specifically it is an object of the present invention to provide an improved mowing attachment which is laterally stable and which may be readily attached to and detached from a tractor having a quick hitch system of the type presenting a single point draft connection.

Another object of the present invention is to provide a mowing attachment of the above outlined type of unusual rigidity which has a single draft point connection with the tractor and stabilizing connections with hydraulically controlled power lift arms of the tractor, and wherein the stabilizing connections are utilized to afford independent control over cutter bar and frame lift movement.

Another object of the present invention is to provide a mowing attachment of the above outlined type having simple and rugged lift mechanisms for the cutter bar and frame, connected at single points of attachment to power lift arms on the tractor and effective to stabilize the mower frame against rearward swinging movement thereof in a manner which does not interfere with the floating ground following movement of the mower or with the ease of attaching the mower frame to the tractor.

A further object of the present invention is to provide a mower attachment having a readily attachable and detachable counterbalance mechanism providing a floating ground following action of the frame and cutter bar.

These and other objects and advantages are attained by the present invention, various novel features of which will be apparent from the description herein and accompanying drawings disclosing an embodiment of the invention, and will be more particularly pointed out in the claims.

Fig. 3 is a fragmentary top view of the mower shown in Figs. 1 and 2 with the tractor omitted;

Fig. 4 is a side view of the mower shown in Fig. 3;

Fig. 5 is a side elevational view on a reduced scale of the mower shown in Fig. 3 with the tractor omitted and showing the frame in a normal crop cutting position;

Fig. 6 is a rear elevational view of the mower shown in Fig. 5;

Fig. 7 is a side elevational view of the mower shown in Fig. 5 with the outer end of the cutter bar in an elevated position of adjustment;

Fig. 8 is a rear elevational view of the mower shown in Fig. 7;

Fig. 9 is a side elevational view of the mower shown in Fig. 5 showing the mower and cutter bar in elevated positions of adjustment; and Fig. 10 is a rear elevational view of the mower shown in Fig. 9.

Figure 1:
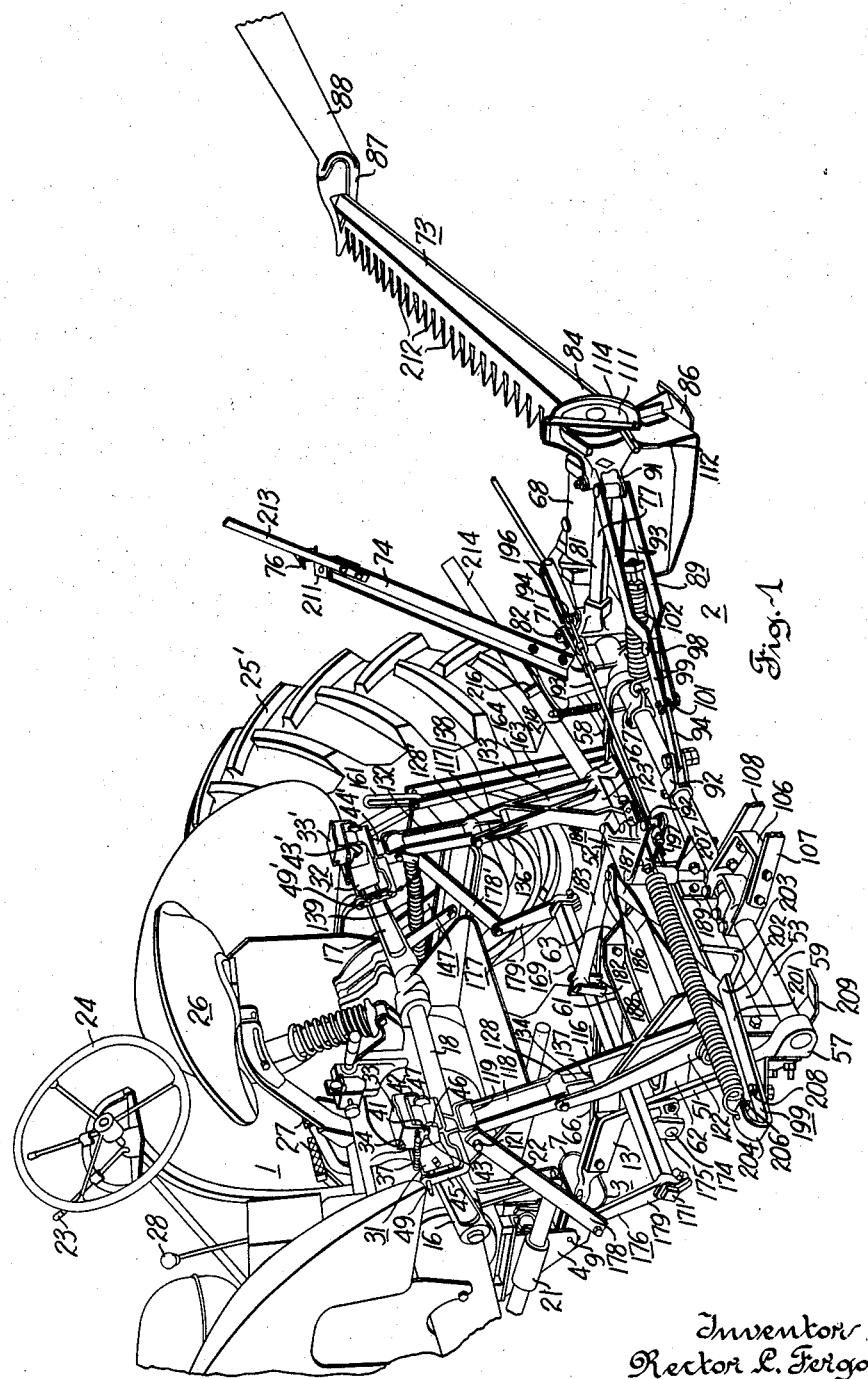
Fig. 1 is a perspective view of a mowing attachment in a mounted position on the rear of a conventional tractor with some parts removed for purposes of disclosure.

Referring to the drawings and particularly Fig. 1 the invention is shown in the combination of a tractor 1 and rear mounted implement such as a mower 2. The tractor 1 is provided with a hitch and a power lift system for readily attaching rear mounted implements thereto and for readily detaching such implements from the tractor. The tractor 1 has a single point draft transmitting connection 3 comprising a depending yoke 4 (Fig. 4) to which a support link 6 is secured by means of pin 9. A bell shaped hitch housing 7 is pivotally mounted on pin 10 carried by link 6. A hitch latch or member 8 is pivotally supported on a pin 10 and biased by a spring (not shown) which is operative to swing the latch 8 so that a hook portion 11 thereof extends through an aperture in the lower portion of the bell housing 7. The latch 8 as shown in Fig. 4 has the hook portion 11 thereof in draft transmitting engagement with hitch means in the form of an eye or loop 12 carried by the forward end or portion 13 of the mower main frame 14. The latch 8 is manually releasable by means (not shown) which is operable from the operator's station on the tractor. The single point draft transmitting connection 3 permits vertical swinging movement of the mower frame 14 about the hitch point.

The tractor 1 is equipped with a conventional power lift system which includes an up and down movable lift element comprising laterally spaced power lift arms 16 and 17 (Fig. 1) fixedly mounted on a transverse rock shaft 18. The power lift arms 16 and 17 are actuated by hydraulic rams 21 and 21' connected to crank arms 22 and 22', on the rock shaft 18. The rams 21 and 21' receive fluid under pressure from a conventional hydraulic pump (not shown) and are operative to apply vertical swinging movement to the lift arms 16 and 17. The admission of hydraulic fluid to the rams is controlled by a suitable valve (not shown) which is manually operated by a lever 23 conveniently positioned adjacent the conventional steering wheel 24 of the tractor. The tractor 1 further includes rear drive wheels 25 and 25', a conventional operator's station 26, a conventional foot clutch control (not shown), and brake and gear shift controls, 27 and 28, respectively.

Figure 2:
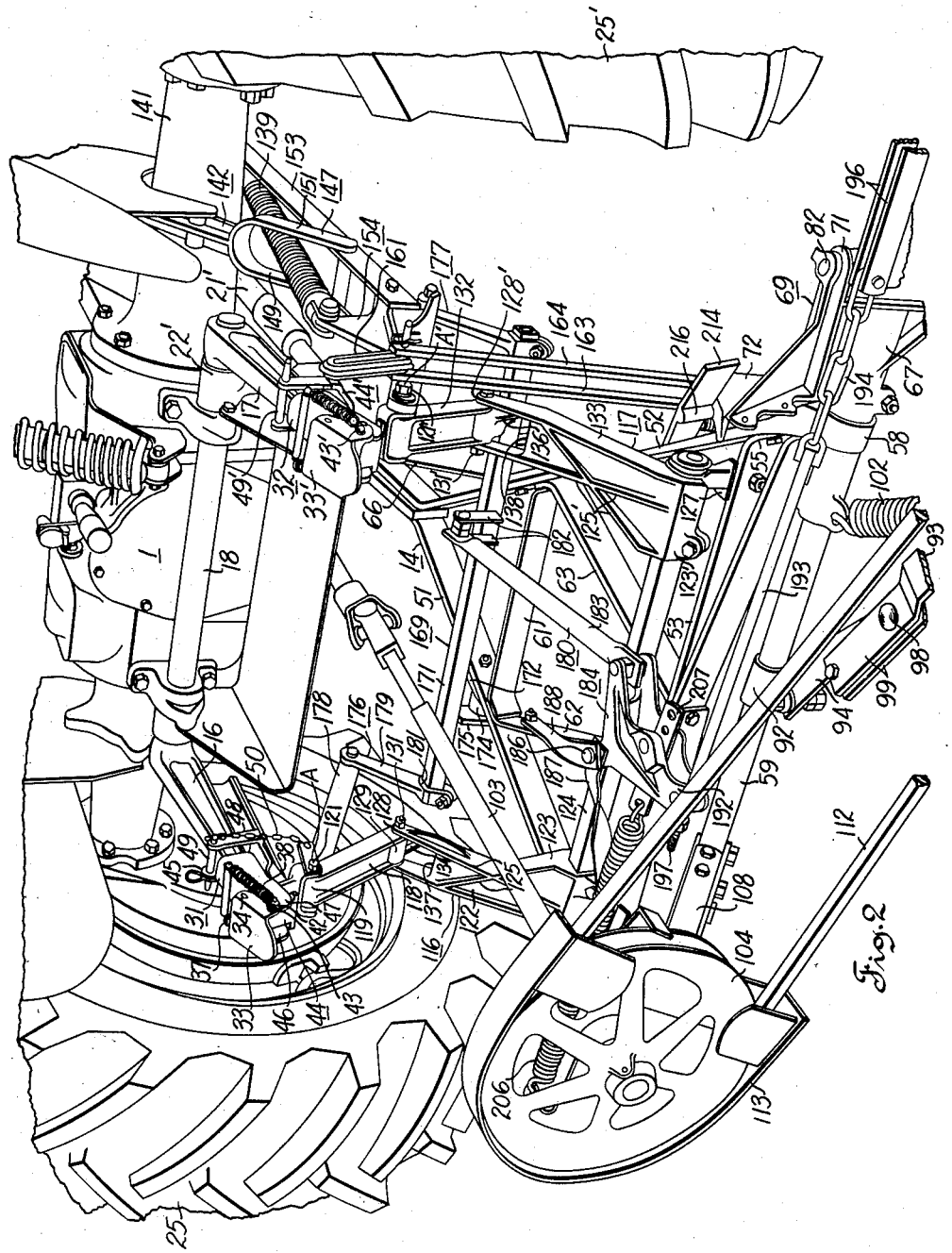
Fig. 2 is an enlarged fragmentary perspective view of the mower and tractor shown in Fig. 1, the view of Fig. 2 being taken at a somewhat different angle.

The lift arms 16 and 17 are provided with latching brackets or implement attaching means 31 and 32 as shown in Figs. 1 and 2. As the brackets are identical in construction only bracket 31 will be described. The latching bracket 31 is secured to the lift arm 16 as by bolting and includes a latch member 33 pivotally mounted thereon by means of a pin 34. The latch member 33 is positionable in locked or unlocked positions and maintained in either position as desired by a pair of springs 37, 38 which are positionable in overcenter relation to either side of the pivot center defined by pin 34. As appears in Figs. 2 and 4 the latch member 33 has suitable detents 41 and 42 which are adapted to partially surround a coupling stud 43. The detents are cooperable with jaws 46 and 47 (Fig. 1) presented by bracket 31.

In operation the coupling stud or pin 43 is, as appears in Fig. 4, carried by an adapting bracket 44 presented by the implement. The pin 43 is slipped into jaws 46 and 47 presented by the bracket 31 and locked into place therein by closing the latch member 33. The adapting bracket 44 presents vertically extending laterally spaced leg portions 45 and 48 (Figs. 2, 3 and 4) which are positionable in straddling relation to lift arm 16. The bracket 44 is locked in place by a pin 49 which extends through suitable apertures in legs 45 and 48. A chain 50 secures pin 49 to the implement to prevent its loss. A similar adapting bracket 44' is provided on the implement for mounting on bracket 32 carried by lift arm 17. As the bracket 32 is identical in construction to bracket 31 including a spring biased latch 33' for locking a stud 43' in place on the lift arm 17, further description thereof is deemed unnecessary.

The main frame 14 of the mower 2, as best shown in Fig. 3, is of generally triangular shape and includes left and right side portions 51 and 52 which are bolted together at their forward ends 13 to coupler eye member 12. The base or rearward portion of the triangular frame is formed by a frame bar 53 which presents bight portions 54 and 55 secured to the rearward ends of frame side portions 51 and 52 as by bolting. A rear trunnion support 57 is secured as by bolting to the rearward end of side frame portion 51 and a similar trunnion support 58 is secured to the rearward end of side frame portion 52. Trunnion supports 57 and 58 serve to pivotally support a transversely extending main frame shaft 59 which extends parallel to and rearward of frame bar 53. The frame structure is reinforced by inner triangular brace members 61, 62 and 63 which interconnect frame side portions 51, 52 with frame bar 53. The coupler eye member 12 is reinforced by a side bracket 66 which extends from an intermediate point on side frame member 52, to a point of connection of the forward portion 13 of the frame. The grassward end 67 of the main frame shaft 59, that is, the end on which a cutter bar drive 73 is mounted, extends outward beyond the trunnion 58 and a supporting bracket 69 for a cutter bar drive mechanism 68 is fixedly mounted thereon. The supporting bracket 69 includes a vertical pivot shaft mounting hinge 71 which receives a pin 82 on which a cutter bar drive supporting structure 77 is mounted for rearward swinging movement. The bracket 69 further includes a quadrant section 72 which is utilized for adjusting the amount of tilt of the cutter bar 73 as will be more fully explained hereinbelow. Fixedly mounted on supporting bracket 69 adjacent quadrant 72 as by bolting is a supporting angle 74 which mounts a cutter bar latch mechanism 76 best shown in Figs. 3 and 4. The angle 74 and associated cutter bar latch mechanism 76 are used to fixedly lock the cutter bar 73 in an elevated position for purpose of transport as will be more fully described hereinbelow.

Referring to Figs. 1 and 3 the supporting structure 77 for the cutter bar driving mechanism 68, includes front and rear trunnion supports 78 and 79, respectively, which are rigidly connected by a cross shaft 81. The cutter bar driving mechanism 68 is pivotally mounted by means of trunnions (not shown) between trunnion supports 78 and 79 for vertical swinging movement about an axis extending longitudinally of the tractor, that is, in the direction of tractor travel. The cutter bar or working tool 73 is fixedly connected as by bolting (not shown) to the cutter bar drive mechanism 68. As the cutter bar driving mechanism forms no part of the present invention, further detailed description thereof will be omitted, it being sufficient to know that this drive mechanism is operative to reciprocate the sickle knife of the cutter bar 73 in a conventional manner. The inner end 84 of the cutter bar 73 and the associated driving mechanism 68 are supported by an inner ground engaging shoe or runner 86 (Fig. 1) and the outer end of the cutter bar 73 is supported by an outer ground engaging shoe or runner 87. The outer end of the cutter bar further includes a swathboard 88 which is mounted thereon in a manner well known in the art. It will be understood that the driving mechanism 68 and associated cutter bar 73 are free to swing rearwardly about the axis of pin 82. The cutter bar 73 is maintained in cutting relation at right angles to the path of tractor travel by a breakback mechanism 89 which will now be described.

The rear trunnion 79 includes a bracket 91 adapted to mount one end of a cutter bar breakback mechanism 89. A similar breakback mounting bracket 92 is fixedly mounted on the main frame shaft 59. The breakback mechanism is in the form of a spring actuated toggle mechanism which is interposed in bracing relation between the rear trunnion 79 and the main frame shaft 59 to hold the cutter bar 73 in right angled relation to the path of tractor travel. The toggle consists of a relatively long member 93 and shorter member 94. The members 93, 94 are pivotally connected together by a pivot bolt 98. The long toggle member 93 has an extension portion 99 thereon which mounts a stop element 101. The stop element 101 engages the short member 94 to determine the proper straight line relation of the members and thus the right angle position of the cutter bar relative to the path of tractor travel. A coil spring 102 is operatively interconnected between the main frame shaft 59 and the long member 93. During the cutting operation the tension of spring 102 is sufficient to maintain the members 93 and 94 in the substantial straight line relation to each other as shown in Fig. 3. Should the cutter bar 73 encounter an obstruction of some sort sufficient to overcome the tension of spring 102 the breakback members 93 and 94 will jackknife or collapse and allow the cutter bar 73 to swing rearwardly about its mounting on the pivot 82. In order to reengage the breakback mechanism the operator simply backs up the tractor so that the cutter bar 73 will again assume the right angled position and in this position the tension of the spring 102 again becomes effective to hold the breakback members 93 and 94 in a straight line relationship.

The power train (Fig. 2) for operating the cutter bar driving mechanism 68 includes a power take-off shaft 103 and a driving sheave 104. Supporting structure for the power train includes a bracket 106 (Figs. 3 and 4) fixedly mounted on the frame shaft 59 as by bolting and a pair of upper sheave support braces 107 and 108 which are fixedly mounted upon the support bracket 106. A bearing support bracket 109 is bolted to the upper ends of the support braces 107 and 108 and rotatably supports the rearward end of the power take-off shaft 103. The driving sheave 104 is fixedly attached to the projecting rearward end of the power take-off shaft 103. A lower driven sheave 111 (Figs. 1, 3 and 4) is rotatably mounted on the cutter bar driving mechanism 68 and a V-belt 112 is operatively trained about the sheaves 104 and 111. It will be understood that the operator may selectively actuate the power take-off shaft by operation of a control lever (not shown). Actuation of the power take-off shaft 103 drives the upper sheave 104 and this, through belt 112, drives lower sheave 111 which operates the cutter bar driving mechanism 68. The upper and lower driving sheaves 104 and 111 are provided with suitable belt guards 113 and 114, respectively, for operator safety.

The main frame 14 is pivotally conected to the hitch member or latch 8 for vertical swinging movement. Extensible and contractible lift force transmitting means in the form of articulated lost motion linkages 116 and 117 are operatively interposed between the frame 14 and the implement attaching means 31, 32 presented by lift arms 16 and 17 to initiate up and down swinging movement of the frame in response to movement of the lift arms. The linkage 116 (Figs. 1, 2 and 4) includes a first upper lift link 118 which has its upper end 119 pivotally mounted by means of pin 121 at one point designated by the character A on the lift arm adapting bracket 44 of the implement attaching means 31. A first lower lift link 122 has its lower end 123 (Fig. 2) fixedly mounted on a cross shaft 124 rotatably mounted in vertically spaced relation to frame 14 by means of brackets 126 and 127 (Figs. 2 and 3) which are secured as by bolting to the rear frame bar 53. The upper end 128 of link 122 is pivotally connected to the lower end 129 of lift link 118 by pin 131. The other articulated linkage 117 is identical in construction to linkage 116 and includes second upper and lower lift links 132 and 133, respectively, pivotally interconected between point A' on implement attaching means 32 presented by lift arm 17 and the cross shaft 124.

From the foregoing it will be understood that the extensible and contractible lift force transmitting means includes first and second lower lift links 122 and 133 each having one end pivotally mounted on the frame 14. The first upper link 118 is pivotally connected at its opposite ends to the other end 128 of the first lower link 122 and one of the lift arms 16; and the second upper link 132 is pivotally connected at its opposite ends to the other of end 128' of the second lower link and to the other lift arm 17.

The lift force transmitting jacknife linkages 116 and 117 additionally serve as stabilizing means to provide lateral rigidity for the mower frame 14 thereby preventing lateral movement thereof relative to the tractor. Referring particularly to Fig. 2 it will be noted that the lower ends 123 and 123' of the lower links 122 and 133 are connected to portions 126 and 127 of frame 14 that are located in spaced relation to the hitch means 12 and are flared outward to a considerable width to provide bracing for the links. The links 122 and 133 are further reinforced by ribs 125 and 125', respectively, which serve to prevent twisting thereof under torsional loads. The upper ends 128 and 128' of links 122 and 133, respectively, are connected to the trailing laterally rigid power lift arms 16 and 17 by the upper links 118 and 132. The pivot pin receiving apertures presented by the opposite ends of links 118 and 132 are machined to provide a close tolerance fit for mounting pivot pins 121, 131 and 121' and 131'. In addition the bearing surfaces presented are of sufficient width to assure a laterally rigid interconnection between the lower links 122 and 133 and the lift arms 16 and 17, respectively.

Referring to Figs. 2, 4 and 5 it will be noted that when the mower is in an operative cutting position the lift force transmitting means 116 and 117 are in jackknifed or collapsed position. This collapsed condition performs a lost motion function and renders the frame lift means 116 and 117 inoperative during one phase, that is, during the first part of upward movement of the power lift arms 16 and 17 and operative during the other phase or second part of power lift arm movement to initiate upward swinging movement of the frame 14. In other words upward movement of the power lift arms 16 and 17 can have no lifting effect upon the frame 14 until they have been raised high enough to cause the linkages 116 and 117 to assume the straight line position shown in Fig. 7. Then further upward movement of the lift arms will be effective to raise the mower frame. Thus to raise the frame the operator need only to actuate the power lift arms by means of control lever 23.

As a practical matter it is desired to have the linkages 116 and 117 jackknife in only one direction, that is, forwardly as illustrated in Figs. 2, 4 and 5. To provide for this tongue portions 134 and 136 are formed integral with links 118 and 132, respectively, and coact with stop members 137 and 138 on lower links 122 and 133 to prevent the linkages from passing over center and collapsing rearwardly.

During operation it is desired that only a small portion of the frame weight be carried on the inner shoe 86 so that the mower will have a light but positive ground following action. To achieve this a substantial portion of the weight of the mower is carried by a counterbalance spring 139 (Figs. 1, 2, 3 and 4) which is operatively interposed between the mower frame and the tractor for biasing the frame 14 in an upward direction. Fixedly attached to the tractor axle structure 141 is a pair of balance spring supporting brackets 142 and 143 best shown in Fig. 4. The brackets straddle the axle structure 141 with the free ends 144 and 146, respectively, of each bracket being provided with yokes 147 and 148. The lateral spacing between legs 149 and 151 (Fig. 2) of the yoke 147 being sufficient to allow counterbalance spring 139 to pass therebetween. The ends of the yokes 147 and 148 fixedly support a pair of longitudinally extending rail members 152 and 153 thereon. A bell crank or power transmitting element 154 is pivotally mounted between the rearward ends of rail members 152 and 153. Resilient means in the form of counterbalance spring 139 is operatively interposed between one arm 156 of power transmitting element 154 and the tractor carried rails 152 and 153. The forward end 157 (Figs. 3 and 4) of spring 139 is mounted to provide a spring tension adjustment through the provision of a threaded stud 158 which passes through a trunnion 159 carried by the forward ends of the rail members 152 and 153. The stud 158 is secured in trunnion 159 by a nut and the tension of spring 139 can be varied by adjusting the nut. The other arm 161 of bell crank 154 is provided with a slotted extension member 162. A connecting link or power transmitting element, in the form of a pair of tension straps 163 and 164, is pivotally and slidably attached at its upper end by quick hitch pin 166 to the slotted extension 162 presented by the other arm 161 of bell crank 154. The other ends of the straps 163 and 164 are pivotally connected to a bracket 167 carried by side frame portion 52. The bell crank 154 and straps 163 and 164 constitute a pair of slidable interconnected power transmitting elements connected at their free ends, respectively, with frame 14 and with the tractor carried rail members 152 and 153. The bell crank 154 is provided with a stop member 168 which functions by contacting rail members 152 and 153 to limit the amount of upward movement of the bell crank 154. It will be understood that during the normal cutting operation the stop member does not encounter the rail members 152 and 153. When it is desired to detach the mower the frame 14 is raised until the stop member 168 limits further upward movement of the bell crank 154. Further upward movement of the frame 14 then moves links 163 and 164 upward in slot 162 thereby releasing pressure on the quick hitch pin so that it may be easily withdrawn. Further details of the attaching and detaching procedure will be discussed hereinbelow.

From the foregoing it will be appreciated that the operator has control over the frame raising and lowering. In addition the operator is afforded an independent control for raising and lowering the outer end of the cutter bar 73. This is accomplished by power transmitting means 169 (Figs. 1 and 2) operatively connecting the cutter bar 73 and the power lift arms 16 and 17, so that upward movement thereof is utilized to elevate the outer end of the cutter bar 73 independent of any frame raising movement. The power transmitting means 169 includes a rock shaft 171 pivotally mounted on rock shaft pivot brackets 172 and 173. The rock shaft pivot brackets are fixedly attached to the side frame portions 51 and 52 and are provided with stub shafts 174 (only one appears in Fig. 4) adapted to receive suitable hanger arms 175 mounted on the rock shaft 171. The rock shaft is actuated by lever structures 176 and 177 which connect the lift arm adapting brackets 31 and 32 with the rock shaft 171. As the lever structures 176 and 177 are identical only lever structure 176 will be described. The lever structure 176 (Figs. 2 and 4) includes a lift strap or first link 178 which has its upper end pivotally connected to point A on the lift arm bracket 31. It will be noted that this is the same point at which upper lift link 118 is connected. A first crank arm 179 is pivotally connected at one of its ends to the lower end of the lift strap 178 and the other or lower end 181 of the first crank arm 179 is fixedly attached on rock shaft 171 as by bolting. The lever structures 176 and 177 are laterally rigid; the links 178, 179 and 178', 179' (Fig. 3) being only free to pivot in fore and aft directions. As these lever structures connect the frame and tractor lift arms it will be appreciated that they cooperate with lift linkages 116 and 117 and aid in stabilizing the frame 14 against lateral movement. The bracing effect of lift linkages 116, 117 and lever structures 176 and 177 results in the frame 14 being maintained in parallel relation to the tractor axle 141 for all vertically adjusted positions thereof. From the foregoing it will be appreciated that as the power lift arm 16 is raised the lift strap 178 will pivot the crank arm 179 clockwise thereby pivoting rock shaft 171. The other lever structure 177 includes a second link 178' corresponding to first link 178 and a second crank arm 179' corresponding to crank arm 179.

The rock shaft 171 includes a lever arm 182 (Fig. 2) and rearward movement of the arm 182 is operative through actuating or thrust transmitting means 180 for raising the cutter bar 73 in response to lift arm movement. The thrust transmitting means 180 includes a push bar 183 operatively connected with one end of a rocker or first bell crank 184. The bell crank 184 is pivotally mounted on a pin 186 carried by rear frame bar 53. Reinforcing members 187 and 188 serve to brace the upper end of pin 186 on which the bell crank 184 is pivotally mounted. Additional bracing is provided for the lower end of pin 186 by bracket 189 (Fig. 1) which extends between frame bar 52 and main frame shaft 59. The other or free end 192 of the bell crank is connected with the pivotally mounted cutter bar drive assembly 68 by means of rod 193, chain 194 and hinged bracket 196. As shown in Fig. 1, end 197 of rod 193 has a threaded portion which passes through an aperture in bell crank arm 192 and is secured therein by a nut. It will be appreciated that the effective length of rod 193 can be varied by tightening the nut. Rearward movement of the push bar 183 will serve to actuate the bell crank 184 and thereby pivot drive mechanism 68 about trunnion supports 78 and 79 thus raising the outer end of the cutter bar 73. In operation the cutter bar is free to float to a vertical upright position or to a position 45 degrees below horizontal without disturbing the elevation of the frame 14. Upward float is accommodated by chain 194. In floating downward, the weight of the cutter bar tensions the cutter bar raising linkage 169 and pulls the lift arms 16 and 17 down. This is possible as during the cutting operation the rams 21 and 21' are not energized and are free to contract under slight pressure. The frame elevation is not disturbed as downward movement of the lift arms 16 and 17 only further contracts lift linkages 116 and 117.

A cutter bar counterbalancing mechanism 199 (Fig. 1) is operatively interposed between the frame 14 and the cutter bar raising linkage 169 to aid in upward swinging movement of the cutter bar. Referring to Fig. 1 a lever arm 201 is pivotally mounted by pin 208 on rear trunnion 57. One end 202 of the lever arm 201 is provided with a hand lever 203. The other end of the lever arm opposite the hand lever 203 is provided with a spring attaching bracket 204 and a counterbalance spring 206 is interconnected between bracket 204 and a mounting strap 207 carried by bell crank 184. The mounting strap 207 is provided with a series of holes and the tension of spring 206 may be varied by changing the position of strap 207 on the bell crank within the limits defined by the holes. In Fig. 1 the counterbalance spring 206 is shown in a condition of tension and in this position the hand lever 203 has been pushed forwardly until the lever arm end 202 abuts the brace 187. In this position the other or spring mounting end 204 of the lever arm 201 has moved rearwardly a sufficient distance so that the line of action of spring 206 is rearward of the pivot center 208 as seen in Fig. 3. In this position the tension of spring 206 locks lever 201 against brace 187 as seen in Fig. 3 thus keeping cutter bar raising tension on the bell crank 184. When it is desired to release the tension of counterbalancing spring 206 it is only necessary to pull the hand lever 203 rearwardly thus passing the line of action of spring 206 back past the pivot center 208 and allowing the lever 201 to swing rearwardly a sufficient distance to relax the spring. In addition to counterbalancing the cutter bar the spring 206 keeps all slack out of the cutter raising linkage thereby assuring instant raising of the outer end of the cutter bar when the lift arms 16 and 17 are raised.

From the foregoing explanation it will be appreciated that the mower attachment is mounted to the tractor at only four points. Referring particularly to Fig. 1 the mower is attached at the bell housing 7, at each of the power lift arms 16 and 17 and at the counterbalance spring bell crank 154. To attach the mower to the tractor the operator simply backs the tractor into the mower frame until the bell housing 7 engages the coupler eye 12 (Fig. 4) of the mower. The operator then reaches down and positions each adapting bracket coupling stud 43 and 43' on the power lift arm brackets 31 and 32. The adapter brackets are secured in place by inserting pins 49 and 49' and by moving the latch members 33 and 33' into the overcenter locked position. To conclude the mounting operation the balance spring straps 163 and 164 are secured in the bell crank slot 162 by means of quick hitch pin 166 and the cutter bar counterbalance spring 206, which was released or relaxed when the mower was detached, is tensioned by pivoting lever 201.

In order to properly position the mower frame for attaching, the left end portion of the rear frame bar 53 as viewed in Fig. 1 is provided with a small skid or support leg 209 which cooperates with the inner shoe 86 of the mower to maintain the frame in a level position when it is setting on the ground and to present the coupler eye portion 12 thereof at a proper elevation for engagement with the bell housing 7 of the tractor as it is backed rearward into attaching relationship.

It will be understood that in order to detach the mower the above described procedure is simply reversed. The mower frame is raised until the stop 168 contacts rails 152 and 153 and the pin 166 begins to ride up in the slotted extension 162. The pin 166 is then withdrawn. The frame 14 is then lowered to the ground and counterbalance spring 206 is released by moving hand lever 203 rearwardly. This releases the tension on the cutter bar lift force transmitting structures 176 and 177 and associated adapting brackets 44 and 44'. The latch members 33 and 33' are released and pins 49 and 49' removed to detach adapting brackets 44 and 44'. The latch 8 in bell housing 7 is then released and the tractor may be driven away. It will be appreciated that the bell crank 154, and associated counterbalance mechanism may be left on the tractor at all times as it is in a position where it will not interfere with the mounting of other implements. However, if removal is desired it is only necessary to remove three cap screws 219, 221 and 222 (Fig. 4).

A transport position (not shown) is provided for the cutter bar 73 when it is necessary for the tractor to travel highways and the like with the mower mounted thereon. In the transport position the cutter bar 73 is pivoted about trunnions 78 and 79 past a vertical position and then lowered across the mower frame until the cutter bar rests upon latch bracket 211 carried by the angle 74 (Figs. 1 and 4). The bracket 211 pivotally mounts the spring biased latch 76 which hooks over the cutter bar to lock it in the transport position.

The angle 74 also serves as a cutter bar tilt control lever. As described hereinbefore the cutter bar drive support bracket 69 is fixedly secured on the pivotally mounted shaft 59. A tilt lever 213 is secured to angle 74 and clockwise movement of the lever 213 and bracket 69 as viewed in Fig. 1 will rock the associated cutter bar drive 68 and cutter bar 73 about the axis of shaft 59 and raise the forward ends of the cutter bar guards 212 to result in a higher level of cut. Counterclockwise rocking of lever 213 will move the guards 212 closer to the ground and result in a closer cut. The desired tilt setting is maintained by a locking brace 214 which has its forward end pivotally secured to side frame portion 52. The brace 214 is provided with a locking pin 216 which is insertable in any one of the series of holes 217 (Fig. 4) presented by the quadrant section 72 to prevent movement from a desired tilt setting. The brace 214 and pin 216 are maintained in locking position on the quadrant by the action of spring 218 which extends from an intermediate point on brace 214 to trunnion portion 58. To change the amount of tilt the brace 214 is raised until pin 216 disengages the quadrant and the cutter is then tilted by moving tilt lever 213. When the desired portion is reached the pin 216 is again engaged in a suitable hole presented by the quadrant section 72. Referring to Fig. 4 it will be noted that both driving sheave 104 and driven sheave 111 are supported on shaft 59. During cutter bar tilt adjustment both sheaves move with the shaft 59 thus maintaining perfect driving alignment.

The frame mounting as above described affords the operator independent control over the raising and lowering of the outer end of the cutter bar 73 and of the raising and lowering of the frame 14 (as shown in Figs. 5 through 9). It will be appreciated that both linkages, that is, the power transmitting linkage 169 for raising and lowering the outer end of the cutter bar 73 and the lift force transmitting means 116 and 117 for raising and lowering the frame 14 are attached to lift arms 16 and 17 for pivotal movement about a transverse axis passing through points A and A' thereon. This single point of attachment for both linkages on each of power lift arms facilitates the simple and quick attaching and detaching above described.

Referring particularly to Figs. 5 and 6 it will be seen that the cutter bar 73 is in an operative position, that is, the cutter bar is down parallel to the ground in cutting relationship. Should the operator note an obstruction which would interfere with the outer portion of the cutter bar 73 he actuates the power lift arms 16 and 17 by means of hydraulic control lever 23 (Fig. 1). As the power lift arms 16 and 17 elevate they raise the links 178 and 178' which in turn lift crank arms 179 and 179' to pivot rock shaft 171 and thereby move push rod 183 rearwardly. Rearward movement of the push rod 183 actuates bell crank 184 thus tensioning linkage 193, 194, 196 (Fig. 2) to raise the outer end of the cutter bar as shown in Fig. 6. It will be noted that as the outer end of the cutter bar elevates, the position of the mower frame 14 remains unchanged. Only the outer end of the cutter bar has been elevated. During actuation of the cutter bar lift linkage 169 the collapsed lift means or articulated links 116 and 117 have been opening to a straight line relation thereby providing a predetermined lost motion movement and it is not until these links assume an approximate straight line relationship (as shown in Fig. 7) that upward swinging movement of the lift arms 16 and 17 will be transmitted to elevate the frame 14 of the mower.

Continued upward swinging movement of the lift arms 16 and 17 brings the tongues 134 and 136 of the upper lift links 118 and 132, respectively, into contact with the stop portions 137 and 138 (Fig. 2) presented by the lower lift links 122, 133, respectively. When this position is reached upward movement of the lift arms 16 and 17 is transferred through the lift force transmitting linkages 116 and 117 to the mower frame 14 and elevation thereof takes place to the position shown in Figs. 9 and 10.

Referring to Figs. 4, 5 and 6 it will be seen that applicant has provided a mowing attachment which has a single point draft connection with the tractor. The frame lift linkage and the cutter bar linkage are not operative to transmit draft as they are in a relaxed state as shown in Figs. 4 and 5 during operation. Lateral stability of the mower frame is provided by the frame lift force transmitting linkages 116 and 117 and the power transmitting means. Any tendency of the cutter bar 73 to swing rearwardly about the point of draft connection at bell housing 7 is effectively resisted by these linkages which transmit the drag forces of the cutter bar to the power lift arms of the tractor.

It should be understood that it is not intended to limit the invention to the particular forms and details herein shown and described and that the invention includes such other forms and modifications as are embraced by the scope of the appended claims.

What is claimed is:

1. In combination with a tractor having a laterally rigid up and down movable implement lift element and a single point hitch member, an implement frame having forward and rearward portions, hitch means interposed between said forward portion of said frame and said hitch member providing a single draft transmitting connection between said tractor and said frame which will permit up and down movement of the latter relative to said tractor, a working tool mounted on said rearward portion of said frame for up and down swinging movement relative thereto, laterally stable power transmitting means interconnecting said working tool and said lift element and responsive to movement of the latter for raising said working tool about its pivotal mounting on said frame, and extensible and contractible laterally stable lift force transmitting means operatively connected between a portion of said frame located in spaced relation to said hitch means and said lift element to eliminate lateral movement of said frame relative to said tractor and for transmitting frame raising movement of said lift element to said frame.

2. An implement attachment for a tractor of the type having a pair of laterally spaced up and down movable lift arms and a single point hitch member comprising; a frame connected in draft transmitting relation with said hitch member for up and down movement relative thereto; a cutter bar mounted on said frame for swinging movement relative thereto about an axis extending longitudinally of said tractor to raised and lowered positions; a rock shaft mounted on said frame for pivotal movement relative thereto; first and second crank arms fixedly attached to longitudinally spaced portions of said rock shaft; a first link pivotally connected at its opposite ends respectively to said first crank arm and to one of said lift arms, and a second link pivotally connected at its opposite ends respectively to said second crank arm and to the other of said lift arms, actuating means operatively interposed between said rock shaft and said cutter bar for pivoting the latter about said axis in response to pivotal movement of said rock shaft relative to said frame; and extensible and contractible lift force transmitting means operatively connecting said lift arms with said frame.

3. An implement attachment for a tractor of the type having a pair of laterally spaced up and down movable lift arms and a single point hitch member comprising; a frame connected in draft transmitting relation with said hitch member for up and down movement relative thereto; a cutter bar mounted on said frame for movement relative thereto about an axis extending longitudinally of said tractor to raised and lowered positions; a rock shaft mounted on said frame for pivotal movement relative thereto about an axis extending transversely to the direction of tractor travel; a lever arm mounted on said rock shaft; first and second crank arms fixedly attached to longitudinally spaced portions of said rock shaft; a first link pivotally connected at its opposite ends respectively to said first crank arm and to one of said lift arms; a second link pivotally connected at its opposite ends respectively to said second crank arm and to the other of said lift arms for pivoting said rock shaft in response to upward movement of said lift means; actuating means operatively interposed between said rock shaft lever arm and said cutter bar for pivoting the latter about said longitudinal axis in response to pivotal movement of said rock shaft relative to said frame; and extensible and contractible lift force transmitting means operatively connecting said lift arms with said frame so that the latter is raised upon a predetermined amount of movement of said lift arms.

4. An implement attachment for a tractor of the type having a pair of laterally spaced up and down movable lift arms and a single point hitch member comprising; a frame connected in draft transmitting relation with said hitch member for up and down movement relative thereto; a cutter bar mounted on said frame for movement relative thereto about an axis extending longitudinally of said tractor to raised and lowered positions; extensible and contractible lift force transmitting means including first and second lower links each having one end pivotally mounted on said frame, a first upper link pivotally connected at its opposite ends to the other end of said first lower link and one of said lift arms, and a second upper link pivotally connected at its opposite ends to the other end of said second lower link and to the other of said lift arms, so that a predetermined amount of movement of the latter will be effective through said lift force transmitting means to raise said frame relative to said tractor; and power transmitting means operatively connecting said lift arms with said cutter bar for pivoting the latter about said longitudinal axis.

5. The combination recited in claim 4 wherein said power transmitting means includes a rock shaft mounted on said frame for pivoted movement relative thereto; first and second crank arms fixedly attached to longitudinally spaced portions of said rock shaft; a first link pivotally connected at its opposite ends respectively to said first crank arm and to one of said lift arms, and a second link pivotally connected at its opposite ends respectively to said second crank arm and to the other of said lift arms, and actuating means operatively interposed between said rock shaft and said cutter bar for pivoting the latter about its pivotal mounting in response to pivotal movement of said rock shaft relative to said frame.

6. An implement attachment for a tractor of the type having a pair of laterally spaced up and down movable lift arms and a single point hitch member comprising; a frame extending longitudinally of said tractor and connected in draft transmitting relation with said hitch member for up and down movement relative thereto; a transversely extending cutter bar mounted on said frame for movement relative thereto about a longitudinal axis to raised and lowered positions; extensible and contractible lift force transmitting means for raising and lowering said frame in response to lift arm movement including laterally stable first and second lower links each having one end mounted on said frame for pivotal movement about an axis extending transversely of said frame, a first upper link connected at its opposite ends respectively to the other end of said first lower link and one of said lift arms for pivotal movement about axes extending transversely of said frame, a second upper link connected at its opposite ends respectively to the other end of said second lower link and the other of said lift arms for pivotal movement about axes extending transversely of said frame; and power transmitting means operatively connecting said lift arms with said cutter bar for pivoting the latter about said longitudinal axis in response to lift arm movement.

7. A mowing implement for use with a tractor having a pair of laterally spaced power lift arms and a single point hitch member, comprising a frame pivotally connected to said hitch member for up and down movement relative thereto, a cutter bar mounted on said frame for movement relative thereto to raised and lowered positions, power transmitting means connecting said lift arms with said cutting mechanism and responsive to movement of said lift arms for raising said cutting mechanism about its pivotal mounting, and lift means including laterally stable extensible and contractible jackknife linkages operatively connected between said frame and lift arms to raise said frame in response to movement of said lift arms.

8. The combination recited in claim 7 wherein each of said jackknife linkages includes a lower link having one end thereof pivotally mounted on said frame, an upper link having its opposite ends pivotally mounted respectively on the other end of said lower link and on one of said lift arms, each of said upper links being in jackknife relation to its respective lower link for rendering said lift means inoperative during the first phase of lift arm movement to permit a predetermined amount of cutter bar raising movement prior to frame raising movement and in an open straight line position during the second phase of upward lift arm movement to raise said frame in response to movement of said lift arms.

9. The combination recited in claim 8 wherein said power transmitting means includes a rock shaft pivotally mounted on said frame, first and second crank arms fixedly attached to longitudinally spaced portions of said rock shaft, a first link pivotally connected at its opposite ends respectively to said first crank arm and to one of said lift arms, and a second link pivotally connected at its opposite ends respectively to said second crank arm and to the other of said lift arms, and actuating means operatively interposed between said rock shaft and said cutter bar for moving the latter to raised and lowered positions in response to pivotal movement of said rock shaft relative to said frame.

10. In a mowing implement for a tractor having a single point hitch member and a pair of laterally spaced vertically swingable lift arms each having implement attaching means thereon; the combination comprising a frame having a forward portion connected in draft transmitting relation with said hitch member for vertical swinging movement; a cutter bar mounted on said frame for movement relative thereto to raised and lowered positions; power transmitting means operatively connected between said cutting mechanism and said implement attaching means on each of said lift arms and responsive to movement of the latter to raise said cutter bar about its pivotal mounting; extensible and contractible lift force transmitting means including first and second lower links each having one end pivotally mounted on said frame, a first upper link pivotally connected at its opposite ends respectively to the other end of said first lower link and to said implement attaching means on one of said lift arms, and a second upper link pivotally connected at its opposite ends respectively to the other end of said second lower link and to said implement attaching means on the other of said lift arms, said upper and lower links being in jackknifed relation to each other so that movement of said lift arms will be effective through said power transmitting means to raise said cutter bar a predetermined distance and extend said upper and lower links into a straight line lift force transmitting relation with each other whereby further movement of said lift arms will be effective to raise said frame relative to said tractor.

11. In combination with a tractor of the type having a pair of laterally spaced up and down movable lift arms and a single point hitch member, a frame having a forward portion pivotally connected to said hitch member and a side portion extending from said forward portion generally rearwardly of said tractor; a cutter bar operatively mounted on said frame for vertical swinging movement relative thereto and positionable in laterally extending relation to said side portion; power transmitting means operatively connecting said lift arms with said cutter bar including a rock shaft pivotally mounted on said frame and having a lever arm thereon, a lever structure operatively interconnecting each lift arm with said rock shaft including first and second crank arms fixedly attached to longitudinally spaced portions of said rock shaft, a first link pivotally connected at its opposite ends respectively to said first crank arm and one of said lift arms, and a second link pivotally connected at its opposite ends respectively to said second crank arm and to the other of said lift arms, a double armed rocker pivotally mounted on said frame and having one arm thereof operatively connected with said cutter bar, the other arm of said rocker operatively interconnected with said rock shaft lever arm, whereby movement of said lift arms will pivot said rock shaft and raise said cutter bar; and lift means including laterally rigid extensible and contractible links connecting said frame with each of said lift arms, said links being in a contracted position when said lift arms are in one position for providing a predetermined amount of lost motion movement thereof relative to said frame as upward vertical swinging movement of said cutter bar relative to said frame is taking place, and in an extended position when said lift arms are in the other position to transmit upward vertical swinging movement to said frame.

12. An implement attachment for a tractor of the type having a pair of laterally spaced up and down movable lift arms and a single point hitch member comprising; a frame connected in draft transmitting relation with said hitch member for up and down movement relative thereto; a cutter bar mounted on said frame for up and down swinging movement relative thereto about an axis extending longitudinally of said tractor; extensible and contractible lift force transmitting means including laterally stable first and second lower links each having one end pivotally mounted on said frame, a first upper link pivotally connected at its opposite ends respectively to the other end of said first lower link and to one of said lift arms, and a second upper link pivotally connected at its opposite ends respectively to the other end of said second lower link and to the other of said lift arms, so that a predetermined amount of movement of the latter will be effective through said lift force transmitting means to raise said frame relative to said tractor; means operatively interposed between said frame and said tractor for yieldingly assisting said frame in an upward direction; and power transmitting means operatively connecting said lift arms with said cutter bar for pivoting the latter about said longitudinal axis.

13. The combination recited in claim 12 wherein said means for yieldingly assisting said frame includes a pair of power transmitting elements, one of said elements pivotally mounted on said tractor, the other of said elements having its opposite ends connected respectively with said frame, and with said one element at a point thereon in radially spaced relation to its point of pivotal mounting on said frame, a lever arm mounted on said one element, and a counterbalance spring operatively connected between said lever arm and said tractor.

14. An implement attachment for a tractor of the type having a pair of laterally spaced up and down movable lift arms and a single point hitch member comprising; a frame connected in draft transmitting relation with said hitch member for up and down movement relative thereto; a cutter bar mounted on said frame for up and down swinging movement relative thereto about an axis extending longitudinally of said tractor; extensible and contractible lift force transmitting means including first and second lower links each having one end mounted on said frame, a first upper link pivotally connected at its opposite ends respectively to the other end of said first lower link and to one of said lift arms, and a second upper link pivotally connected at its opposite ends to the other end of said second lower link and to the other of said lift arms, so that a predetermined amount of movement of the latter will be effective to raise said frame relative to said tractor; means operatively interposed between said tractor and said frame for biasing the latter in an upward direction including a bell crank pivotally mounted on said tractor, a counterbalance spring operatively interposed between said tractor and one of said bell crank arms, a connecting link having one of its ends slidably connected with the other arm of said bell crank, the other end of said link pivotally connected to said frame; and stop means carried by said tractor and contacted by said bell crank to limit movement thereof in a frame raising direction.

15. An implement attachment for a tractor of the type having a pair of laterally spaced up and down movable lift arms and a single point hitch member comprising; a frame connected in draft transmitting relation with said hitch member for up and down movement relative thereto; a cutter bar mounted on said frame for up and down swinging movement relative thereto about an axis extending longitudinally in the direction of tractor travel; a rock shaft mounted on said frame for pivotal movement relative thereto about an axis extending transversely of said tractor; first and second crank arms fixedly attached to longitudinally spaced portions of said rock shaft; a first link pivotally connected at its opposite ends respectively to said first crank arm and to one of said lift arms, and a second link pivotally connected at its opposite ends respectively to said second crank arm and to the other of said lift arms for pivoting said rock shaft in response to upward movement of said lift arms; actuating means operatively interposed between said rock shaft and said cutter bar for pivoting the latter about said longitudinal axis in response to pivotal movement of said rock shaft relative to said frame; extensible and contractible lift force transmitting means including first and second laterally rigid lower links, each having one end mounted on said frame for pivotal movement relative thereto about an axis extending transversely of said frame, a first upper link connected at its opposite ends respectively to the other end of said first lower link and one of said lift arms for pivotal movement relative thereto about axes extending transversely of said frame, a second upper link connected at its opposite ends to the other end of said second lower link and the other of said lift arms for pivotal movement relative thereto about axes extending transversely of said frame for raising and lowering said frame in response to a predetermined amount of lift arm movement; and means operatively interposed between said tractor and said frame for biasing the latter in an upward direction including a bell crank pivotally mounted on said tractor, a counterbalance spring operatively interposed between said tractor and one arm of said bell crank, a connecting link having one of its ends slidably connected with the other arm of said bell crank, the other end of said connecting link pivotally connected to said frame, and stop means carried by said tractor and contacted by said bell crank to limit movement thereof in a frame raising direction.

References Cited in the file of this patent
UNITED STATES PATENTS 2,787,879    Johnson _____ Apr. 9, 1957